(12) United States Patent
Guermoud et al.

(10) Patent No.: US 10,033,962 B2
(45) Date of Patent: Jul. 24, 2018

(54) METHOD AND DEVICE FOR INVERSE TONE MAPPING

(71) Applicant: THOMSON Licensing, Issy-les-Moulineaux (FR)

(72) Inventors: Hassane Guermoud, Cesson Sévigné (FR); Cedric Thebault, Chantepie (FR); Jonathan Kervec, Paimpont (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/789,053

(22) Filed: Oct. 20, 2017

(65) Prior Publication Data

US 2018/0115742 A1 Apr. 26, 2018

(30) Foreign Application Priority Data

Oct. 20, 2016 (EP) .................................. 16306378

(51) Int. Cl.
*H04N 7/01* (2006.01)
*H04N 5/14* (2006.01)
(Continued)

(52) U.S. Cl.
CPC ........... *H04N 7/0125* (2013.01); *G06T 5/009* (2013.01); *G06T 5/40* (2013.01); *H04N 5/147* (2013.01);
(Continued)

(58) Field of Classification Search
CPC ..... H04N 7/0125; H04N 5/147; H04N 19/136
See application file for complete search history.

(56) References Cited

U.S. PATENT DOCUMENTS 9,159,270 B2 10/2015 Ninan et al.
9,288,489 B2 * 3/2016 Mertens ................. H04N 19/46
(Continued)

FOREIGN PATENT DOCUMENTS

| EP | 2961169 | 12/2015 |
|---|---|---|
| WO | WO2014114223 | 7/2014 |
| WO | WO2015077329 | 5/2015 |

OTHER PUBLICATIONS

Boitard et al., "Zonal brightness coherency for video tone mapping", Signal Processing: Image Communication, vol. 29, No. 2, Feb. 28, 2014, pp. 229-246.
(Continued)

*Primary Examiner* — Brian Yenke
(74) *Attorney, Agent, or Firm* — Brian J. Dorini; Lily Neff

(57) ABSTRACT

A method for converting a standard dynamic range (SDR) sequence into a high dynamic range (HDR) sequence is described. The method includes determining (S1) successive shots in the SDR sequence by cut detection, detecting (S2) if the SDR sequence comprises a sub-sequence of at least two successive short shots having a duration lower than $D_1$, said subsequence comprising at least one bright shot having a luminance and a size greater than $L_1$ and $SZ_1$ respectively, and mapping (S3) the luminance range of bright shots of the detected subsequence from the low dynamic range to a first high dynamic range and mapping the other shots of the SDR sequence from the standard dynamic range to a second high dynamic range in order to generate the HDR sequence, the first high dynamic range having a maximal value $L_{max1}$ lower than that of the second high dynamic range $L_{max2}$.

13 Claims, 4 Drawing Sheets

(51) Int. Cl.
*H04N 19/136* (2014.01)
*G06T 5/40* (2006.01)
*G06T 5/00* (2006.01)

(52) U.S. Cl.
CPC ............ *G06T 2207/10016* (2013.01); *G06T 2207/20208* (2013.01)

(56) References Cited

U.S. PATENT DOCUMENTS

| | | | | |
|---|---|---|---|---|
| 9,607,364 | B2* | 3/2017 | Xu | G06T 5/007 |
| 9,767,543 | B2* | 9/2017 | Saxena | G06T 5/009 |
| 2012/0201456 | A1* | 8/2012 | El-Mahdy | G06T 5/009 |
| | | | | 382/167 |
| 2014/0002479 | A1* | 1/2014 | Muijs | G06T 5/50 |
| | | | | 345/589 |
| 2014/0363093 | A1* | 12/2014 | Miller | G06F 3/14 |
| | | | | 382/235 |
| 2015/0243243 | A1* | 8/2015 | Greenebaum | H04N 21/42202 |
| | | | | 345/506 |
| 2016/0027160 | A1 | 1/2016 | Aydin et al. | |
| 2016/0253792 | A1* | 9/2016 | Xu | H04N 1/6052 |
| | | | | 345/590 |
| 2016/0286226 | A1* | 9/2016 | Ridge | H04N 19/30 |
| 2016/0292834 | A1* | 10/2016 | Tsuru | G06T 5/009 |
| 2016/0358319 | A1* | 12/2016 | Xu | H04N 1/4072 |
| 2016/0381398 | A1* | 12/2016 | Saxena | H04N 21/2353 |
| | | | | 348/39 |
| 2017/0061592 | A1* | 3/2017 | Reinhard | G06T 5/008 |
| 2017/0103729 | A1* | 4/2017 | Huang | G06T 5/20 |
| 2017/0142312 | A1* | 5/2017 | Dal Mutto | H04N 13/0239 |
| 2017/0256039 | A1* | 9/2017 | Hsu | G06T 5/009 |
| 2017/0287120 | A1* | 10/2017 | Sato | G06T 5/007 |
| 2017/0330312 | A1* | 11/2017 | Nam | G06T 5/009 |
| 2018/0007356 | A1* | 1/2018 | Kadu | H04N 19/126 |
| 2018/0061026 | A1* | 3/2018 | Kozuka | G06T 5/009 |

OTHER PUBLICATIONS

Boitard et al., "Survey of Temporal Brightness Artifacts in Video Tone Mapping", HDRi2014 Second International Conference and SME Workshop on HDR Imaging, 2014, Sarajevo, Bosnia and Herzegovina, Mar. 4, 2014, pp. 1-6.
Koprinska et al., "Temporal video segmentation: A survey", Signal Processing: Image Communication, vol. 16, No. 5, Jan. 2001, pp. 477-500.
Saranya et al., "Survey on a New Approach for Video Cut Detection Using Fuzzy Logic Control", International Journal of Engineering Research & Technology, vol. 2, No. 12, Dec. 2013, pp. 1805-1809.
Anonymous, "Summed-area table", Wikipedia, https://en.wikipedia.org/wiki/Summed_area_table, Sep. 2017, pp. 1-2.
May, S., "The future looks bright: Prepare to be dazzled by HDR telly tech", The Register, http://www.theregister.co.uk/2014/12/11/breaking_fad_high_dynamic_range_hdr_tv_roadmap/?page=2, Dec. 11, 2014, pp. 1-4.

* cited by examiner

METHOD AND DEVICE FOR INVERSE TONE MAPPING

REFERENCE TO RELATED EUROPEAN APPLICATION

This application claims priority from European Patent Application No. 16306378.7, entitled "METHOD AND DEVICE FOR INVERSE TONE MAPPING," filed on Oct. 20, 2016, the contents of which are hereby incorporated by reference in its entirety.

TECHNICAL FIELD

The present invention relates generally to the field of inverse tone mapping.

BACKGROUND ART

Over the past years, High Dynamic Range (or HDR) displays have become more and more popular during the international electronics exhibitions. They offer a new user experience as they can show images and videos with high brightness (until 4000 nits) compared to standard or Standard Dynamic Range (SDR) displays (150-400 nits). HDR devices are able to display videos with more details in black levels and with a higher global contrast. Despite the growth of HDR video content, there is a need to display existing standard videos on HDR displays. For this purpose, inverse tone mapping operators (ITMO) have been developed for converting video from Standard Dynamic Range (SDR) to High Dynamic Range (HDR) avoiding banding issues when luminance is extended. ITMO could be used either as a plugin within a post-production tool to help colorist for manual grading, or as hardware within a System On Chip (Soc) for set-top box or TV set. In the latter case, SDR-HDR conversion is achieved on the fly.

Despite the above-mentioned advantages of the HDR displays, it has been commonly noticed that viewers can be blinded by pictures presenting high peak of brightness especially inside dark rooms. Therefore, viewers are distracted by some parts of bright image breaking the immersion from the movie action, even dazzled when watching a sequence of explosion scenes.

More specifically, HDR video sequences presenting transitions from dark to bright sequences generate a series of flash that cause eye strain for the viewers. This discomfort is much higher as the frequency of alternating dark to bright scene is higher. This is often the case in action movies. This effect is not visible in the SDR version because the brightness of each video shot of the sequence is manually adjusted during the color grading operation in order to ensure maximum visual comfort for the viewer. But this problem is not taken into account in the existent SDR to HDR conversion (or inverse tone mapping) process.

SUMMARY OF INVENTION

The present invention proposes a new way to manage regions with high peak of brightness during SDR-HDR conversion (inverse tone mapping).

According to the invention, it is proposed to limit the maximum luminance value of bright shots of the HDR sequence when there is an alternation of bright and non-bright shots of short duration.

More specifically, the invention relates to a method for converting a video sequence having a standard dynamic range, called SDR sequence, into video sequence having a high dynamic range, called HDR sequence, comprising the step of:

determining successive video shots in the SDR sequence by cut detection, a video shot being a portion of the SDR sequence between two successive cuts, each video shot having a duration, detecting if the SDR sequence comprises a sub-sequence of at least two successive video shots, called short video shots, having a duration equal to or lower than a first duration threshold, said subsequence further comprising at least one video shot, called bright video shot, comprising at least one key frame including a bright area having a luminance value greater than a luminance threshold and a size greater than a size threshold, mapping the luminance range of bright video shots of the detected subsequence from the standard dynamic range to a first high dynamic range and mapping the other shots of the SDR sequence from the standard dynamic range to a second high dynamic range in order to generate the HDR sequence, the first high dynamic range having a maximal value lower than the maximal value of the second high dynamic range.

The bright video shots of the detected subsequence are thus mapped with a reduced high dynamic range.

In a particular embodiment, the luminance range of bright video shots of the detected subsequence and subsequent bright video shots are mapped from the standard dynamic range to the first high dynamic range until a non-bright video shot having a duration greater than a second duration threshold is detected, said second duration threshold being greater than the first duration threshold. In this embodiment, the high dynamic range of bright video shots is reduced when a subsequence of short video shots is detected and returns to the normal range when a non-bright video shot having a duration greater than a second duration threshold is detected.

In a particular embodiment, the first duration threshold is approximately equal to 2 seconds and/or the second duration threshold is approximately equal to 3 seconds.

In a particular embodiment, the method further comprises a step for detecting an ambient luminance. In this embodiment, the luminance range of bright video shots of the detected subsequence and, where appropriate, subsequent bright video shots are mapped from the low dynamic range to the first high dynamic range only if the detected ambient luminance is lower than a luminance threshold.

The invention also concerns a device for implementing the above-mentioned method. More specifically, the invention relates to a device for converting a video sequence having a standard dynamic range, called SDR sequence, into video sequence having a high dynamic range, called HDR sequence, comprising:

a circuit for determining successive video shots in the SDR sequence by cut detection, a video shot being a portion of the SDR sequence between two successive cuts, each video shot having a duration, a first detector for detecting if the SDR sequence comprises a sub-sequence of at least two successive video shots, called short video shots, having a duration equal to or lower than a first duration threshold, said subsequence further comprising at least one video shot, called bright video shot, comprising at least one key frame including a bright area having a luminance value greater than a luminance threshold and a size greater than a size threshold, and a mapper for mapping the luminance range of bright video shots of the detected subsequence from the standard dynamic range to a first high dynamic range and mapping the other shots of the SDR sequence from the standard dynamic range to a second high dynamic range in order to generate the HDR sequence, the first high dynamic range having a maximal value lower than the maximal value of the second high dynamic range.

In a particular embodiment, the first detector and the mapper are arranged such that the luminance range of bright video shots of the detected subsequence and subsequent bright video shots are mapped from the standard dynamic range to the first high dynamic range until a non-bright video shot having a duration greater than a second duration threshold is detected, said second duration threshold being greater than the first duration threshold. The high dynamic range of bright video shots is thus reduced when a subsequence of short video shots is detected and returns to the normal range when a non-bright video shot having a duration greater than a second duration threshold is detected.

In a particular embodiment, the first duration threshold is approximately equal to 2 seconds and/or the second duration threshold is approximately equal to 3 seconds.

In a particular embodiment, the device further comprises a second detector for detecting an ambient luminance. In this embodiment, the second detector is coupled to the first detector such that the luminance range of bright video shots of the detected subsequence and, where appropriate, subsequent bright video shots are mapped from the low dynamic range to the first high dynamic range only if the detected ambient luminance is lower than a luminance threshold.

The invention also concerns an electronic device incorporating the above device for converting a video sequence. Preferably, this electronic device is a camera, a TV set, a monitor, a head mounted display, a set top box, a gateway, a smartphone or a tablet.

The invention also concerns a non-transitory storage medium carrying instructions of program code for executing steps of the above method for converting a video sequence, when said program is executed on a computing device.

BRIEF DESCRIPTION OF THE DRAWINGS

The invention can be better understood with reference to the following description and drawings, given by way of example and not limiting the scope of protection, and in which.

DESCRIPTION OF EMBODIMENTS

Figure 1:
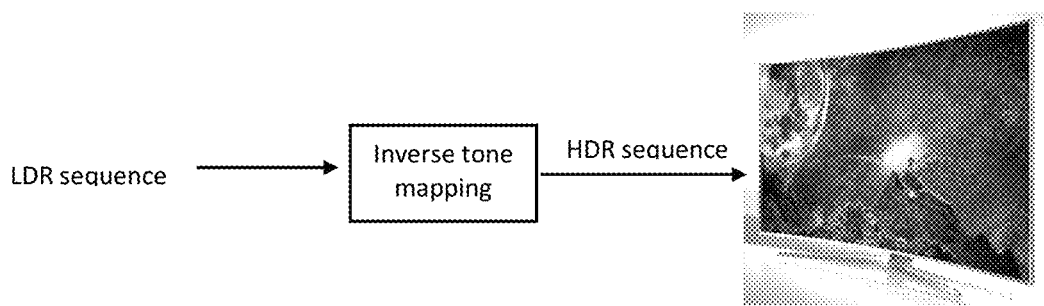
FIG. 1 is a schematic view for illustrating inverse tone mapping.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more details, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks. Specific structural and functional details disclosed herein are merely representative for purposes of describing example embodiments of the present invention. This invention may, however, be embodied in many alternate forms and should not be construed as limited to only the embodiments set forth herein.

FIG. 1 depicts a general workflow where inverse tone mapping operation is implemented in a set-top box as an automatic SDR-HDR conversion of a broadcasted standard video for TV sets. The inverse tone mapping designates the mapping from a low dynamic range to a high dynamic range. In a low dynamic range, the luminance values are classically coded by 8 bits (256 levels) while, in a high dynamic range, the luminance values are coded by 10 bits (1024 levels) or more.

Figure 2:
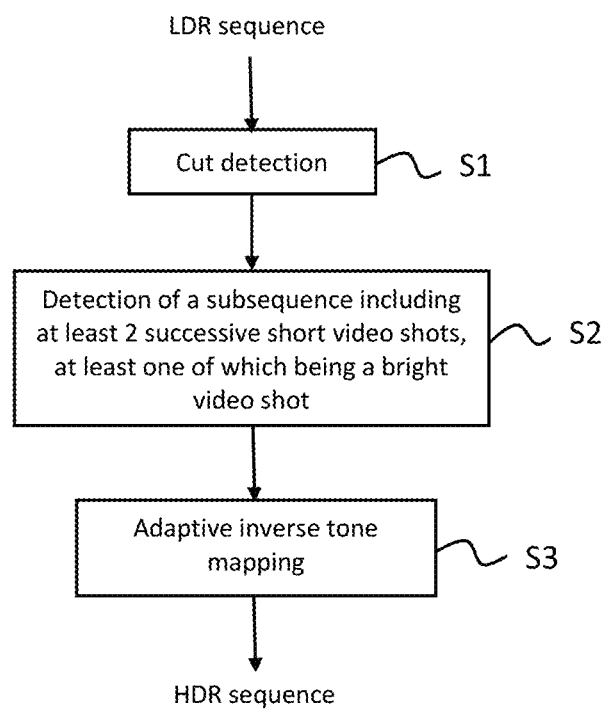
FIG. 2 is a flow chart of the successive steps of the method according to an embodiment of the invention.

FIG. 2 is a flow chart of the inverse tone mapping method according to the invention. The function of the inverse tone mapping method is to convert a standard dynamic range sequence, called SDR sequence, in a high dynamic range sequence, called HDR sequence.

In a first step S1, a cut detection is applied to the SDR sequence to be converted. Successive video shots are thus determined in the LDR sequence. A video shot designates a portion of the SDR sequence between two successive cuts.

Cut detection is a well-known method in video processing. Such a method is for example described in "*Survey on a New Approach for Video Cut Detection Using Fuzzy Logic Control*", Saranya K., Kethsy Prabavathy A., International Journal of Engineering Research & Technology (IJERT), ISSN: 2278-0181, Vol. 2 Issue 12, December 2013 or in "*Temporal video segmentation: A survey*" Irena Koprinskaa, Sergio Carrato, Signal Processing: Image Communication, 16 (2001), 477-500.

The second step, S2, consists in detecting if the SDR sequence comprises a sub-sequence of at least two successive short video shots, at least one of which being a bright video shot. A short video shot designates a shot having a duration equal to or lower than a short duration threshold $d_1$. This short duration threshold $d_1$ is for example equal to 2 seconds. A bright video shot designates a video shot comprising at least one key frame including a bright area having a luminance value greater than a luminance threshold $L_1$ and a size (i.e. surface) greater than a size threshold $SZ_1$. The luminance threshold $L_1$ is for example equal to ⅔ of the maximum value of SDR luminance range and the size threshold $SZ_1$ is for example equal to 1/16 of the total size of the image. These thresholds $L_1$ and $SZ_1$ can however be adapted to the method used to detect bright areas. A method to detect bright areas is to count in every rectangle of the image (for example with a horizontal size of ¼ of the image width and a vertical size of ¼ of the image height) the number of pixels having a luminance higher than $L_1$ (this can be efficiently computed using an integral image.) A rectangle is considered to include a bright area as soon as the number of pixels having a luminance higher than $L_1$ is greater than $SZ_1$. Preferably the luminance of the SDR image is first filtered using for example a Gaussian filter. Alternatively, bright areas can be determined using large Gaussian filters (for example a Gaussian filter with a horizontal standard deviation equal to ¼ of the image width and a vertical standard deviation equal to ¼ of the image height) or box linear filters (for example with a horizontal window size of ¼ of the image width and a vertical window size of ¼ of the image height) applied on the luminance of the SDR image. Since only large areas with a high number of pixels having high luminance values will generate high values at the output of such filters, at the output of this filter any value higher than the luminance threshold $L_1$ will be considered as indicating a bright area.

Then, in a step S3, an adaptive inverse tone mapping is applied to the SDR sequence. According to the invention, the luminance range of bright video shots of the detected subsequence is mapped from the low dynamic range to a first high dynamic range while the other shots of the SDR sequence from the standard dynamic range to a second, high dynamic range, the first high dynamic range having a maximal value $L_{max1}$ lower than the maximal value $L_{max2}$ of the second high dynamic range.

For example, if the images of the HDR sequence are to be coded on 10 bits, the luminance values of the second, high dynamic range will range from 0 and 1024 while the luminance values of the first high dynamic range will only range from 0 to X, with X<1024. X is for example equal to 820.

Therefore, the brightness of the bright video shots having a short duration is reduced in the HDR sequence. The discomfort perceived by the viewer is thus reduced.

In a variant, the brightness of the bright video shots of short duration and some other subsequent bright video shots is reduced until a non-bright video shot having a long duration is detected. A long duration designates a duration greater than a duration threshold $d_2$, with $d_2>d_1$. Non-bright video shots designate the video shots other than the bright video shots.

In this variant, the dynamic range of the bright video shots is kept reduced until a non-bright video shot having a duration greater than D2 is detected such that the transition from a reduced high dynamic range to a normal (non-reduced) high dynamic range is not performed during a subsequence of bright video shots and is thus less perceivable by the viewer.

In a preferred embodiment, the adaptive inverse tone mapping according to the invention is coupled to the detection of the ambient luminance. The inverse tone mapping is implemented on the fly in a set top box equipped by ambient light sensor. The reduced high dynamic range is applied to the bright video shots only when the ambient luminance is lower than a luminance threshold $L_2$. The luminance threshold $L_2$ is for example equal to 50 cd/m2.

Figure 3:
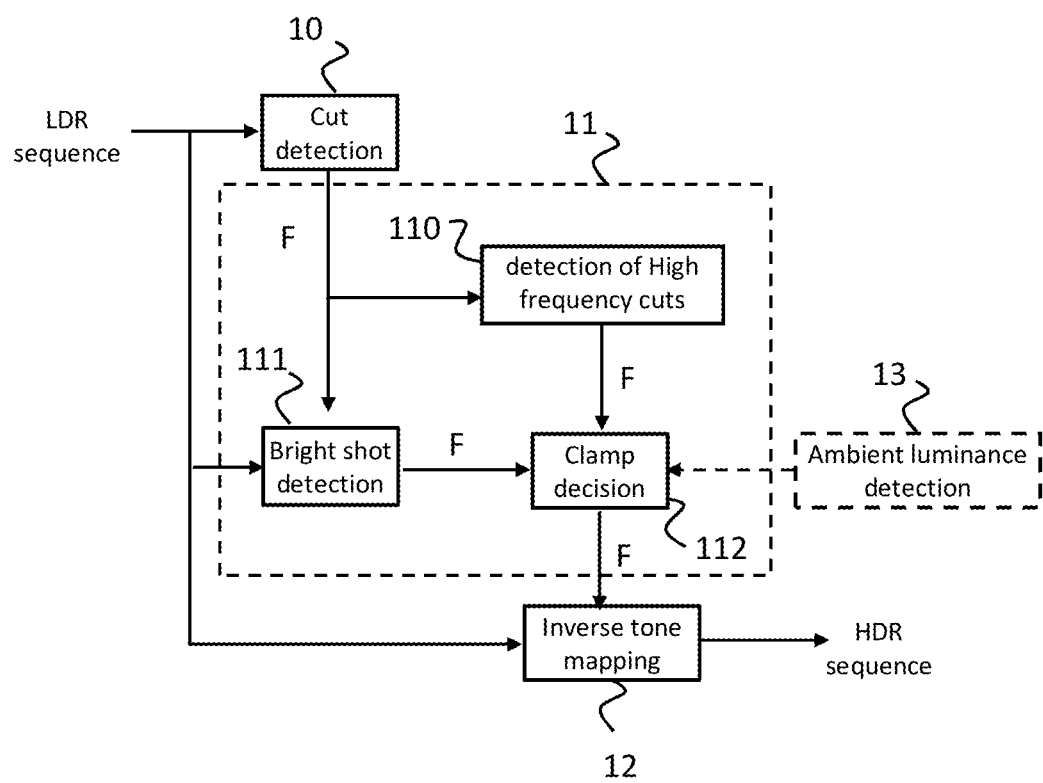
FIG. 3 is a schematic view of a device implementing the method according to the invention.

FIG. 3 is a schematic view of a device implementing the above-described method.

The device comprises:
a circuit 10 for detecting cuts in the SDR sequence;
a detector 11 for detecting if the SDR sequence comprises a sub-sequence of at least two successive short video shots, at least one of which being a bright video shot, and
a mapper 12 for applying inverse tone mapping to the SDR as a function of the results of the detector 11.

The block 10 receives the SDR sequence and delivers a signal F1 comprising a pulse each time a cut is detected.

The detector 11 comprises:
a block 110 for detecting a high frequency of cuts;
a block 111 for detecting bright video shots in the SDR sequence; and
a block 112 for deciding, based on the results of the blocks 110 and 111, if a mapping with reduced high dynamic range should be applied to the bright video shots of the SDR sequence, and The block 110 detects if the SDR sequence comprises a subsequence of short video shots (having a duration equal to or lower than $d_1$) based on the signal F1 and delivers a signal F2 having a high level when such a subsequence is detected.

The block 111 detects if the video shots are bright video shots or non-bright video shots. As mentioned above, a bright video shot is a video shot comprising at least one key frame including a bright area having a luminance value greater than $L_1$ and a size greater than $SZ_1$. The key frame is for example the first frame of the video shot. The block 111 delivers a signal F3 having a high level when a bright video shot is detected.

The block 112 generates a control signal F4 based on the signals F2 and F3. The signal F4 has a high level when a subsequence of short video shots and a bright video shot are detected.

The mapper 12 maps the luminance values of the SDR sequence into the reduced high dynamic range when the signal F4 comprises a high level.

In a preferred embodiment, the device comprises a detector 13 for detecting the ambient luminance and the block 112 applies the reduced high dynamic range to the bright video shots only when the ambient luminance is lower than the luminance threshold $L_2$.

Figure 4:
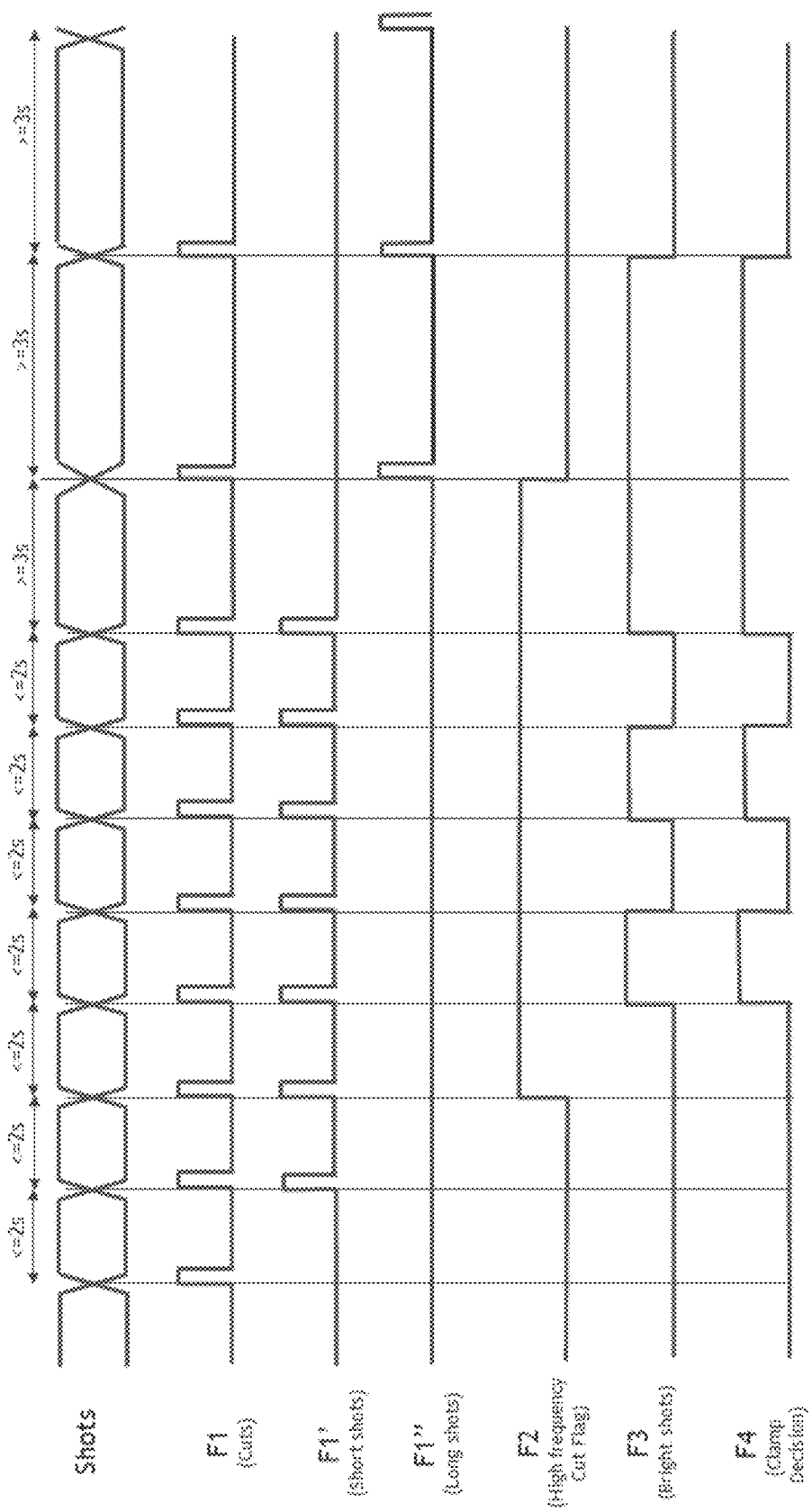
FIG. 4 are diagrams of signals generated by blocks of the device of FIG. 3.
Figure 5:
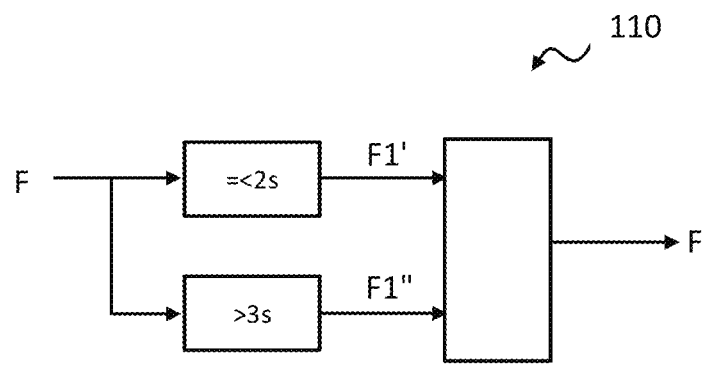
FIG. 5 is a schematic view of a block 110 of the device of FIG. 4.
Figure 6:
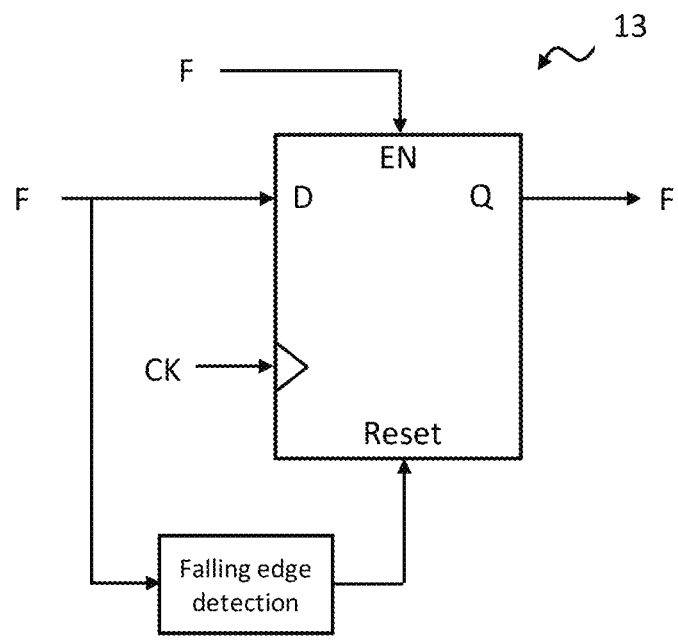
FIG. 6 is a schematic view of a block 112 of the device of FIG. 4.

The invention will be described hereinafter in greater detail for the particular embodiment wherein the dynamic range of the bright video shots is kept reduced until a non-bright video shot having a duration greater than $d_2$ is detected. FIG. 4 gives examples of signals F1 to F4 exchanged by the device of FIG. 3 and FIGS. 5-6 are schematic views of examples of blocks 110 and 112.

The signal F1 outputted by the block 10 comprises a pulse for each detected cut. The signal F1 is then processed by the block 110 to produce two intermediary signals F1' and F1" and the signal F2. The signal F1' comprises a pulse each time a short shot (duration≤$d_1$) is detected and the signal F1" comprises a pulse each time a long shot (duration>$d_2$). The signals F1' and F1" are generated by two sub-blocks of the block 110 (see FIG. 5). In FIG. 4, $d_1$ is equal to 2 s and $d_2$ is equal to 3 s. The signals F1' and F1" are then processed to generate the signal F2. The signal F2 goes from a low level to a high level when at least two consecutive short shots are detected and goes from the high level to the low level when a long shot is detected.

The signal F2 outputted by the block 110 and the signal F3 outputted by the block 111 are then processed by the block 112 to deliver the signal F4. The block 112 is for example a D flip flop as shown on FIG. 6. This flip flop receives the signal F3 on its D input and the signal F2 on its enable input (EN). The flip flop is reset at each falling edge of the signal F1.

The resulting signal F4 is used to control the mapper 12. When the signal F4 has a high level, the bright shots are mapped into a reduced high dynamic range and when the signal F4 has a low level, the bright shots are mapped into a normal (non-reduced) high dynamic range. All the non-bright video shots are mapped into a normal high dynamic range.

This mapping enables to prevent eye-strain.

Although some embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for converting a video sequence having a standard dynamic range, called SDR sequence, into video sequence having a high dynamic range, called HDR sequence, comprising the step of:
    determining (S1) successive video shots in the SDR sequence by cut detection, a video shot being a portion of the SDR sequence between two successive cuts, each video shot having a duration,
    detecting (S2) if the SDR sequence comprises a sub-sequence of at least two successive video shots, called short video shots, having a duration equal to or lower than a first duration threshold ($d_1$), said subsequence further comprising at least one video shot, called bright video shot, comprising at least one key frame including a bright area having a luminance value greater than a luminance threshold ($L_1$) and a size greater than a size threshold ($SZ_1$),
    mapping (S3) the luminance range of bright video shots of the detected subsequence from the standard dynamic range to a first high dynamic range and mapping the other shots of the SDR sequence from the low dynamic range to a second high dynamic range in order to generate the HDR sequence, the first high dynamic range having a maximal value ($L_{max1}$) lower than the maximal value ($L_{max2}$) of the second high dynamic range.

2. The method according to claim 1, wherein the luminance range of bright video shots of the detected subsequence and subsequent bright video shots are mapped from the low dynamic range to the first high dynamic range until a non-bright video shot having a duration greater than a second duration threshold ($d_2$) is detected, said second duration threshold ($d_2$) being greater than the first duration threshold ($d_1$).

3. The method according to claim 2, wherein the first duration threshold ($d_1$) is approximately equal to 2 seconds.

4. The method according to claim 2, wherein the second duration threshold ($d_2$) is approximately equal to 3 seconds.

5. The method according to claim 1, wherein it further comprises a step for detecting an ambient luminance and wherein the luminance range of bright video shots of the detected subsequence and, where appropriate, subsequent bright video shots are mapped from the low dynamic range to the first high dynamic range only if the detected ambient luminance is lower than a luminance threshold ($L_2$).

6. A device for converting a video sequence having a standard dynamic range, called SDR sequence, into video sequence having a high dynamic range, called HDR sequence, comprising:
    a circuit for determining successive video shots in the SDR sequence by cut detection, a video shot being a portion of the SDR sequence between two successive cuts, each video shot having a duration,
    a first detector for detecting if the SDR sequence comprises a sub-sequence of at least two successive video shots, called short video shots, having a duration equal to or lower than a first duration threshold ($d_1$), said subsequence further comprising at least one video shot, called bright video shot, comprising at least one key frame including a bright area having a luminance value greater than a luminance threshold ($L_1$) and a size greater than a size threshold ($SZ_1$), and
    a mapper for mapping the luminance range of bright video shots of the detected subsequence from the standard dynamic range to a first high dynamic range and mapping the other shots of the SDR sequence from the standard dynamic range to a second high dynamic range in order to generate the HDR sequence, the first high dynamic range having a maximal value ($L_{max1}$) lower than the maximal value ($L_{max2}$) of the second high dynamic range.

7. The device according to claim 6, wherein the first detector and the mapper are arranged such that the luminance range of bright video shots of the detected subsequence and subsequent bright video shots are mapped from the standard dynamic range to the first high dynamic range until a non-bright video shot having a duration greater than a second duration threshold ($d_2$) is detected, said second duration threshold ($d_2$) being greater than the first duration threshold ($d_1$).

8. The device according to claim 7, wherein the first duration threshold ($d_1$) is approximately equal to 2 seconds.

9. The device according to claim 7, wherein the second duration threshold ($d_2$) is approximately equal to 3 seconds.

10. The device according to claim 6, wherein it further comprises a second detector for detecting an ambient luminance, said second detector is coupled to the first detector such that the luminance range of bright video shots of the detected subsequence and, where appropriate, subsequent bright video shots are mapped from the low dynamic range to the first high dynamic range only if the detected ambient luminance is lower than a luminance threshold ($L_2$).

11. An electronic device incorporating the device for converting a video sequence according to claim 6.

12. The electronic device according to claim 11 selected in the group consisting of a camera, a TV set, a monitor, a head mounted display, a set top box, a gateway, a smartphone and a tablet.

13. A non-transitory storage medium carrying instructions of program code for executing steps of the method for converting a video sequence according to one of claim 1, when said program is executed on a computing device.

* * * * *